(12) United States Patent
Wheelock et al.

(10) Patent No.: US 6,689,714 B2
(45) Date of Patent: Feb. 10, 2004

(54) CORE-IN-SHELL SORBENT FOR HOT COAL GAS DESULFURIZATION

(75) Inventors: Thomas D. Wheelock, Ames, IA (US); Tetteh T. Akiti, Jr., Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 09/492,516

(22) Filed: Jan. 27, 2000

(65) Prior Publication Data

US 2002/0103074 A1 Aug. 1, 2002

Related U.S. Application Data

(60) Provisional application No. 60/117,409, filed on Jan. 27, 1999.

(51) Int. Cl.[7] .............................................. B01J 20/00
(52) U.S. Cl. ...................................... 502/400; 500/414
(58) Field of Search ................................ 502/400, 340, 502/345, 319, 324, 343, 338, 159, 414

(56) References Cited

U.S. PATENT DOCUMENTS

| | | | |
|---|---|---|---|
| 4,316,813 A | | 2/1982 | Voss |
| 5,179,054 A | * | 1/1993 | Schipper et al. .............. 502/65 |
| 5,433,939 A | | 7/1995 | Wheelock |
| 5,653,955 A | | 8/1997 | Wheelock |
| 5,703,003 A | * | 12/1997 | Siriwardane |

OTHER PUBLICATIONS

Westmoreland, P.R. and Harrison, D.P., 1976, Evaluation of Candidate Solids for High–Temperature Desulfurization of Low–Btu Gases, *Environmental Science and Technology*, 10, pp. 659–661. No month.

Snyder, R.B., Wilson, W.I., Johnson I. And Jonke, A.A., 1977, Synthetic $SO_2$ Sorbents for Fluidized–Bed Coal Combustors, *J. Air Pollu. Con. Ass.*, 27, pp.975–981. No month.

Yang, R.T. and Shen, M.S., 1979, Calcium Silicates: A New Class of Highly Regenerative Sorbents for Hot Gas Desulfurization, *AIChE J.*, 25, pp. 811–819. No month.

Yoo, H.J. and Steinberg, M., 1983, Calcium Silicate Cement Sorbent for $H_2S$ Removal and Improved Gasification Process, Final Report, Morgantown Energy Technology Center, Morgantown, West Virginia, pp. 1–61. No month.

Hong, Z., Huang, X–Y., Zhang, X–Y. and Wu, B–C., 1989, Development of Advanced Synthetic Sulphur Sorbent for Fluidized Coal Bed Combustion, *Proc. Int. Conf. Fluid. Bed Combst.* (1989)(10th) 1, pp. 591–595. No month.

Kamphius, B., Potma, A.W. and Spitsbergen, U., 1989, Regenerative Sorbents for High Temperature Desulfurization of Coal Combustion Gases, *In Proceedings of the 6th Annual International Pittsburgh Coal Conference*, Pittsburgh, Pennsylvania, 2, pp. 994–1003. No month.

Christoforou, S.C., Efthimiadis E.A. and Vasalos I.A., 1995, Sulfidation–Regeneration Cycles of ZnO– and CaO–Containing Sorbents, *Environ. Sci. Tech.*, 29, pp. 372–383. No month.

Jagtap, S.B. and Wheelock, T.D., 1996, Regeneration of Sulfided Calcium–Based Sorbents by a Cyclic Process, *Energy & Fuels*, 10, pp. 821–827. No month.

Chun Han and D.P. Harrison, Simultaneous Shift Reaction and Carbon Dioxide Separation for the Direct Production of Hydrogen, *Chem. Eng. Sci.*, 1994, 49 (No. 24B), pp. 5875–5883. No month.

W.E. Waldron, et al., Production of Hydrogen by Cyclic Sorption Enhanced Reaction Process, *AIChE Journal*, 2001, 47(6), 1477–1479. No month.

Balasubramanian, B., et al. Hydrogen from methane in a single–step process. *Chem. Eng. Sci.*, 1999, 54, 3543–3552. No month.

Ding, Y., et al. Absorption–enhanced steam–methane reforming. *Chem. Eng. Sci.*, 2000, 55, 3929–3940. No month.

Hufton, J. R., et al. Sorption–enhanced reaction process for hydrogen production. *AIChE J.*, 1999, 45, 248–256. No month.

\* cited by examiner

*Primary Examiner*—Stanley S. Silverman
*Assistant Examiner*—Edward M Johnson
(74) *Attorney, Agent, or Firm*—McKee, Voorhees & Sease, P.L.C.

(57) ABSTRACT

A core-in-shell sorbent is described herein. The core is reactive to the compounds of interest, and is preferably calcium-based, such as limestone for hot gas desulfurization. The shell is a porous protective layer, preferably inert, which allows the reactive core to remove the desired compounds while maintaining the desired physical characteristics to withstand the conditions of use.

22 Claims, 5 Drawing Sheets

CORE-IN-SHELL SORBENT FOR HOT COAL GAS DESULFURIZATION

RELATED APPLICATIONS

This application claims the benefit of U.S. Provisional Application No. 60/117,409, filed Jan. 27, 1999, the disclosure of which is hereby incorporated by reference.

GRANT REFERENCE

This invention here set forth was federally funded by the U.S. Department of Energy, Advanced Coal Research at U.S. Colleges and Universities Program, under Grant No. DE-FG22-96PC96203 and Grant No. DE-FG26-99FT40587.

BACKGROUND OF THE INVENTION

Most coal as it occurs in nature contains some sulfur which is converted into gaseous compounds when the coal is either burned or gasified. If coal is burned with excess air, most of the sulfur is converted to sulfur dioxide ($SO_2$). If coal is gasified by reaction with steam and a limited amount of oxygen, the sulfur is largely converted to hydrogen sulfide ($H_2S$) and carbonyl sulfide (COS). Some coal liquefaction processes also produce hydrogen sulfide as a by-product. In all of these cases a hot, multicomponent gas stream is produced which needs to be desulfurized for the purpose of controlling environmental pollution. Flue gas produced by coal combustion generally is a mixture of nitrogen, carbon dioxide, water vapor, oxygen, and sulfur dioxide with the latter being present in a concentration less than 0.1 vol. %. The product of coal gasification is usually a mixture of hydrogen, carbon monoxide, carbon dioxide, water vapor, nitrogen, hydrogen sulfide, and carbonyl sulfide. Again, the sulfur compounds are present in small concentrations.

Numerous methods have been proposed for removing the aforementioned sulfur compounds from gas streams, and several of the methods are in current use. One widely used method for desulfurizing flue gas involves scrubbing the gas with an aqueous suspension of limestone particles which react with sulfur dioxide to produce calcium sulfite and/or calcium sulfate. A waste product is produced in the form of a wet sludge which is difficult to dewater and to dispose. Consequently, the sludge is impounded and stored ad infinitum. Furthermore, this method imposes an energy penalty since the flue gas is cooled for wet scrubbing and subsequently reheated for stack disposal.

Another method for desulfurizing coal combustion gases involves contacting the products of combustion with limestone particles in such a way that a dry, granular waste by-product is produced which is a mixture of calcium sulfate and unreacted lime. Here too, the material presents a waste disposal problem.

Limestone has also been proposed for removing hydrogen sulfide and carbonyl sulfide from the fuel gas produced by gasifying coal. In one system, which is becoming commercialized, limestone particles are added to a fluidized bed gasifier where they react with the sulfurous gases to form calcium sulfide. The calcium sulfide particles are treated subsequently in another fluidized bed reactor with air to convert the calcium sulfide into calcium sulfate for disposal.

In all of these methods the waste is difficult to reclaim and reuse. Therefore, the methods consume prodigious quantities of limestone and generate tremendous amounts of waste for disposal.

Lime (CaO) which is derived from the decomposition of limestone($CaCO_3$) is an excellent sorbent for hot gas cleanup. However, in order to employ lime as a regenerable sorbent, it needs to be strengthened to reduce its friability. Structural based modifiers have been used to try to achieve this.

Alumina has been used as a CaO carrier. Snyder et al. (Snyder, R. B. et al. "Synthetic Sorbents for Removal of Sulfur Dioxide in Fluidized-Bed Coal Combustors," ANL/CEN/Fe-77-1, Argonne National Laboratory, Argonne, Ill., June 1977; Snyder, R. B. et al. "Synthetic $SO_2$ Sorbents for Fluidized-Bed Coal Combustors," *J. Air Poll. Control Assoc.*, 27, pp. 975-981, 1977) introduced CaO into porous alumina pellets by refluxing the substrate in a calcium nitrate solution. Via this method up to 15% CaO was impregnated into the carrier. Wolff (Wolff, H. E. P. Regenerative Sulfur Capture in Fluidized Bed Combustion of Coal: A Fixed Bed Sorption Study. Ph.D. Dissertation, *Delft University of Technology*, Delft, 1991, pp. 1-177) applied a different method to arrive at a similar product. In their work, the alumina and CaO were combined in-sito via a sol-gel technique. They produced a sorbent formulation that contained approximately 6% calcium. Although sorbents fabricated using these two methods produce extremely strong pellets, the preparation methods are expensive and adsorption capacity in terms of weight gain was too low for economical use (Wolff, 1991).

Several zinc-based sorbents have been proposed for desulfurizing hot coal gas. While the materials have a strong affinity for hydrogen sulfide and carbonyl sulfide at high temperature and can be regenerated, they are expensive and decompose at 700° C. and above.

An example of a specific process requiring hot-gas desulfurization is integrated coal gasification combined-cycle power generating systems. Though plants that employ the integrated gasification combined-cycle (IGCC) system provide an efficient means of generating electrical power, the power generating systems call for a sorbent capable of removing $H_2S$ and COS from coal gas at near gasifier operating temperature which can be 1255° K. (1800° F.) or more. The gaseous contaminants, mainly $H_2S$, need to be reduced to less than 100 ppm prior to the coal gas entering the gas turbine (Gasper-Galvin et al. Zeolite-Supported Metal Oxide Sorbents for Hot-Gas Desulfurization. *Ind. Eng. Chem. Res.* 1998, 37 (No. 10), pp. 4157-4166). To maximize the efficiency of an IGCC plant, an adsorbent material capable of removing these contaminants at exit conditions of the gasifier (>900° C.) is preferable. Among various materials which have been proposed for this service, limestone offers several advantages including low cost and widespread availability. Moreover, after limestone is calcined, the resulting CaO in theory can capture 95% or more of the sulfurous species in coal gas when applied within a temperature range of 1070 to 1570° K. (1470 to 2370° F.) (Westmoreland, P. R. and Harrison, D. P. "Evaluation of Candidate Solids for High-Temperature Desulfurization of Low-Btu Gases," *Environmental Science and Technology*, 10, pp. 659-661, 1976). However, lime is soft and friable, and the spent sorbent in the form of CaS is not easily regenerated. Therefore, it has been widely regarded as a material to be used once and then discarded. Unfortunately, materials containing CaS cannot be placed directly in a landfill where they will react slowly with moisture and $CO_2$ under ambient conditions to form $H_2S$.

These problems are not insurmountable. The problem of sorbent regeneration may be overcome, for example, by a new process which converts CaS to CaO by alternately oxidizing and reducing the material (Jagtap, S. B. and Wheelock, T. D., "Regeneration of Sulfided Calcium-Based Sorbents by a Cyclic Process," *Energy & Fuels*, 10, pp. 821-827, 1996; Wheelock, T. D., "Cyclic Processes for Oxidation of Calcium Sulfide, U.S. Pat. No. 5,433,939, Jul. 18, 1995; Wheelock, T. D., " Cyclic Process for Oxidation of Calcium Sulfide, U.S. Pat. No. 5,653,955, Aug. 5, 1997). The poor physical properties may be overcome by combining lime with a stronger material to create a composite structure which retains the chemical reactivity of lime and the strength of the second material. Previous investigations have employed the following general methods for producing a calcium-based composite: (1) infusion of a strong inert porous substrate with a calcium compound, (2) pelletization of a powder mixture followed by partial sintering, and (3) a sol-gel technique.

Pelletization provides a cheaper means of manufacturing a sorbent. The traditional sorbent preparation method is to combine CaO with a binder in a mixture. A patent by Voss entitled "Limestone-based sorbent agglomerates for removal of sulfur compounds in hot gases and methods of making", U.S. Pat. 4,316,813, issued Feb. 23, 1982, described a method for preparing an attrition resistant, highly reactive limestone-based sorbent which involves binding limestone particles with a material such as attapulgite clay or Portland cement. Fine particles of limestone and binder are dry-blended, and then water is added to form a paste which is subsequently agglomerated with a pin mixer or pug mill. The agglomerates are subsequently dried and calcined to produce a sorbent for hot sulfurous gases.

The possibility of utilizing Portland cement in a high temperature sorbent for sulfurous gases was suggested by the work of Yoo and Steinberg (Yoo, H. J. and Steinberg, M. "Calcium Silicate Cement Sorbent for $H_2S$ Removal and Improved Gasification Process" Final Report, DOE/CH/ 00016-1494, Brookhaven National Laboratory, October 1983). This described a method for preparing a sorbent by agglomerating type III Portland cement by itself. A revolving drum pelletizer was used to prepare spherical agglomerates in the 1 to 3 mm size range by spraying water onto the cement powder. The spherical agglomerates or pellets were cured subsequently in an atmosphere of 100% humidity for 28 days. Although the relatively strong, cured pellets proved capable of adsorbing either sulfur dioxide or hydrogen sulfide from simulated coal gas at 1273° K. (1830° F.), their adsorption capacity seemed somewhat limited. Consequently, Portland cement seemed to be a good material for use in a composite structure with limestone since it might contribute to both the strength and adsorption capacity of the product.

There is a great need for inexpensive and reusable sorbents which can be employed at higher temperatures, readily regenerated, and handled without breaking down. Presently available sorbents do not meet all of these criteria.

The present invention does not have the drawbacks of the prior art. The sorbents of the present invention have better mechanical properties than the prior art methods/sorbents, are regenerable, and are inexpensive.

SUMMARY OF THE INVENTION

An object of the invention is to provide a sorbent which has improved physical characteristics for use in harsh conditions.

Another object of the invention is to provide a sorbent that is regenerable.

Another object of the invention is to provide a sorbent which is durable and attrition resistant.

Yet another object of the invention is to provide a sorbent which is inexpensive.

A further object of the invention is to provide a sorbent for desulfurization of hot gas streams.

An additional object of the invention is to provide a calcium-based sorbent for desulfurization of hot gas streams.

These and other objects, features, and advantages will become apparent after review of the following description and claims of the invention which follow.

The present invention is for a "core-in-shell" sorbent, a pelletized sorbent which combines a reactive core and a porous protective shell. The reactive core plus protective shell creates a strong composite material capable of interacting with and adsorbing, for example, sulfurous gases at high temperature. The sorbent can be used for removal of sulfurous gases, such as $H_2S$, from hot coal gas, from the combustion products of coal-fired boilers, or the like.

The core-in-shell sorbent has a core of reactive, but comparatively physically weak, material and a strong shell. The shell may be reactive, semi-reactive, or inert, but retains the structural integrity of the sorbent during its use. The sorbent is also preferably able to retain its structural integrity during numerous cycles of use and regeneration.

The composite material can be prepared from limestone and a hydraulic cement. This material has considerable promise as a sorbent for $H_2S$ at high temperature. By applying the cement as a coating on limestone pellets, a product is produced which combines the high reactivity of lime with the strength of cement. The coating can be made almost entirely of cement or of a mixture of cement and limestone particles. Although the addition of limestone particles to the coating tends to weaken the compressive strength of the final product, it increases the absorption capacity of the material. In addition to the relative concentrations of cement and limestone in the coating, other important parameters are the coating thickness, the type of cement, and the time provided in a pelletizer for strengthening the coating. Good overall results have been achieved with a coating of calcium aluminate refractory cement and limestone particles which was strengthened by prolonged tumbling and heat treatment at 1000° C. While pellets with a coating of Portland cement were very strong initially, they were not as durable after heating and reacting with $H_2S$.

The core-in-shell approach of fabricating structurally enhanced lime sorbents for hot gas desulfurization (HGD) was also employed in a lime-alumina system. Pelletization was the preparation method of choice with this system as well. A suitable shell formulation was found by combining two different alumina powders which differed in mean particle size. Initial sorbent screening led to a formulation that initially contained 90% limestone and 10% alumina in the core. Further development produced a pellet with an overall diameter of 4.80 mm, a shell thickness of 0.78 mm, and a fractional shell volume of 69%. This formulation had a compression strength of 16.4 N/mm (3.7 lb/mm) after heat treatment at 1100° C. and an adsorption capacity of 50 g/kg when exposed to 1.1% $H_2S$ at 880° C. for one hour.

The method of producing the sorbents of the present invention involves first pelletizing powdered limestone in a revolving drum and then coating the pellets with a material in the revolving drum which ultimately forms a strong porous shell. A layered structure is produced which combines the adsorptive properties of the lime core with the strength of the porous shell. The method has been demonstrated with both Portland and refractory cements as well as with sinterable powders. Different hydraulic cements were used as the coating materials. Although most hydraulic cements are extremely strong after curing in a moist atmosphere at low temperature, most of this strength is lost when the pellets are fired to temperatures in excess of 1000° C. In order to manufacture a good cement based "core-in-shell" sorbent more of the sorbent material had to be incorporated into the shell to avoid cracking upon calcination. Hence, the most successful sorbent formulation containing cement has a highly reactive core and a semi-reactive shell.

The "ideal" core-in-shell sorbent, however, consists of a reactive core and an inert shell. This will prevent the shell from undergoing drastic structural changes, which may cause the sorbent to prematurely disintegrate. An inert shell has been achieved using alumina rather than cement. An embodiment of the present invention is the calcium-based reactive core and an inert alumina-based shell.

Though the present work has focused on calcium-based sorbents, the core-in-shell concept can be extended to other sorbent materials such as zinc oxide, zinc titanate, manganese oxide, copper oxide, and iron oxide. Other sorbent materials would be readily known to one of ordinary skill in the art for a particular application.

DETAILED DESCRIPTION OF THE INVENTION

Figure 1:
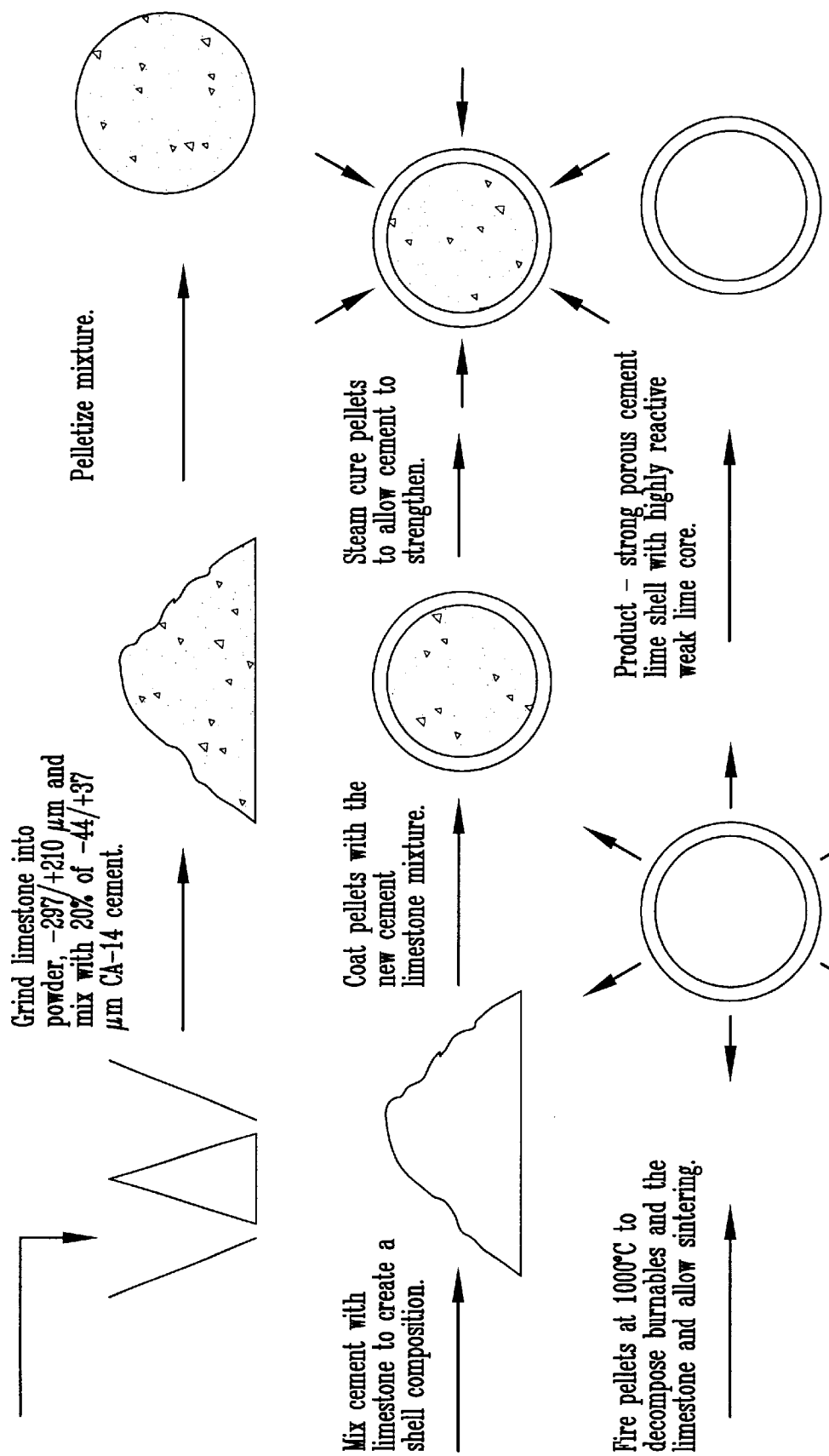
FIG. 1 is the general procedure used to prepare core-in-shell pellets. The case illustrated is for the preparation of pellets consisting of a mixture of limestone and calcium aluminate cement in both the core and shell.

The present invention is a "core-in-shell" sorbent.

The core of the sorbent is a reactive compound. The core is made of material which will adsorb a desired compound or class of compounds or react with the compound(s) in order to remove it from, for example, an effluent stream. For example, for desulfurization of hot gas stream applications the reactive core can be calcium-based, e.g., limestone or lime. The shell of the sorbent is a material which gives the pellet sufficient strength while allowing gas to penetrate to (diffuse to) the sorbent material in the core. With a limestone core, the successful protective layer (shell) has been largely refractory cement or alumina.

Types I, III, and IV Portland cement, high alumina cement (HAC), and calcium aluminate refractory cement have been used as shell materials. These are hydraulic cements which require curing. An alternative shell material is comprised of a sinterable powder (e.g., alumina) which upon heat treatment forms a strong, porous shell.

Examples of core and shell materials which are expected to work are as follows:

| Core material: | Shell material: |
| --- | --- |
| CaO (lime) & (swollen lime) | Bentonite clay |
| $CaCO_3$ (limestone) & (swollen limestone) (dolomite) | Attapugite clay |
| CuO | Zeolite material |
| CuO—$CeO_2$ | Portland cements |
| CuO—$Cr_2O_3$ | High temperature cement |
| CuO—$Fe_2O_3$ | Alumina |
| CuO—$MnO_2$ | Fly ash |
| $MgCO_3$ | Calcium aluminates |
| MgO | Magnesium oxysulfate cement |
| ZnO—$TiO_2$ + $ZrO_2$ | |
| ZnO—CuO—$Fe_2O_3$ | |

One of ordinary skill in the art would be able to determine additional core or shell materials appropriate to their particular application.

A small amount of a pore-forming component, such as dry potato starch, can be mixed with the shell-forming material before being applied. Alternatively, the pore-forming material can be added to the water spray. The starch, or other pore-forming component, will decompose when the pellets are heated to a high temperature, thereby increasing the porosity of the shell. An example of an alternative pore-forming component is granular polyethylene glycol. Any material known to one of ordinary skill in the art which will form pores (decompose at high temperature/temperature of use) without interfering with the purposes of the present invention can be used.

An alternative pore-forming material is limestone itself which can be incorporated in the shell because heating the pellets to the temperature of use will decompose the limestone in the shell and provide sufficient porosity as well as contributing to the sorption capacity.

Generally for any given shell thickness, where the shell is comprised of both core and shell material, as the concentration of core material (e.g., limestone) mixed with shell material (e.g., cement) is increased, the adsorption capacity of the pellets increase. However, the crushing strength is lower than four pellets with smaller concentrations of the more easily crushable core material (e.g., limestone). Although increasing shell thickness can increase pellet strength, it can also reduce the rate of diffusion through the shell and reduce sorbent capacity. One of ordinary skill in the art can optimize the composition for adsorption capacity versus crushing strength for a desired application.

There are at least 4 different cases for the core-in-shell concept.

|  | Case 1: | Case 2: | Case 3: | Case 4: |
|---|---|---|---|---|
| Core | Reactive material only | Reactive material and coating material | Reactive material and coating material | Reactive material only |
| Shell | Coating material only | Coating material only | Reactive material and coating material | Reactive material and coating material |
| Advantages | Unreactive shell undergoes no structural changes during adsorption and regeneration. Reactive core maximizes weight gain. | Unreactive shell undergoes no structural changes during adsorption and regeneration. Core offers some strength; overall pellets strength is significantly higher than Case 1. | Core and shell contribute to adsorption capacity. | Core and shell contribute to adsorption capacity. Weight gain is more than in Case 3. |
| Disadvantages | Core is weak, pellet strength is sacrificed. | Weight gain is sacrificed for strength. | Shell may undergo structural changes during adsorption and regeneration. | Shell may undergo structural changes during adsorption and regeneration. Strength is greatly sacrificed due to limited amount of coating material in the entire pellet. |

Material of the shell can also be incorporated into the material of the core. For example, cement or alumina can be added to a limestone core.

Though the sorbent can be produced by any method which gives the desired physical characteristics, one of the preferred methods, and that which is found to work, is as follows. A measured amount of powdered limestone is placed in a pelletizing drum. As the drum revolves, a controlled amount of water is added as a fine spray. With the right amount of water, the powder balls up into spherical pellets. The conditions can be controlled to produce limestone pellets of a desired diameter. The pellets are then coated with the protective layer. The powdered material for the protective layer, e.g., cement or alumina, is added to the pelletizing drum while the pellets are sprayed at set intervals with water. Such a process can be carried out continuously by using two pelletizing drums in series separated by a vibrating screen. The core forming ingredients are supplied at a constant and controlled rate to the first pelletizing drum, and as the spherical cores are formed, they are discharged onto the vibrating screen. The material which passes through the screen is returned to the first pelletizing drum for repelletizing. The pellets which do not pass through the screen are conducted to the second pelletizing drum for coating with the shell forming material.

The pellets prepared for laboratory tests were comprised of cores which ranged from 3-5 mm in diameter and of shells which ranged from 0.3-0.8 mm in thickness. Pellets prepared for commercial application can be either smaller or larger. One of skill in the art would be able to choose the core and shell dimensions which will work best for the particular application of interest.

Following preparation of the preferred embodiment of the cement-coated pellets, excess moisture is removed by air drying, and then the pellets are cured in a steam atmosphere at 100° C. for 1-3 days. In the case of the preferred embodiment of the alumina-coated pellets, neither air drying nor steam curing is required.

In the preferred embodiment, the sorbent can be used by contacting a hot gas stream with the pellets in either fixed bed, moving bed, fluidized bed or other conventional contacting equipment. One of ordinary skill in the art would be able to determine amounts or ratios of sorbent to use based on reactive material used, compound to be sorbed, and the like. Likewise, in applications other than hot gas desulfurization, one of ordinary skill in the art will be able to determine conventional contacting methods which will be effective for their particular application. For example, when a lime-based sorbent is used to remove $H_2S$ from a hot gas stream, the quantity of sorbent material would be based on the following reaction:

$$CaO+H_2S=CaS+H_2O \qquad (1)$$

The sorbent can be regenerated by a proven cyclic oxidation and reduction method (see Wheelock, U.S. Pat. Nos. 5,433,939 and 5,653,955). Other methods will be within the scope of knowledge of one of ordinary skill in the art.

EXAMPLES

Limestone and Cement

Methods and Materials

Limestone was obtained from the Three Rivers Quarry located near Smithland, Kentucky. According to the supplier, the material typically contains 92.8% $CaCO_3$, 5.9% $MgCO_3$, and 1.1% $SiO_2$ after drying at 105° C. Samples of several types of Portland cement were obtained from various manufacturers including type I (made by Lafarge Corp.), type III (made by Holnam Inc.), and type IV (made by Armstrong Cement Corp.). The following designations are used to represent the cements; PC-I for type I, PC-III for type III, and PC-IV for type IV. PC-I and PC-III consisted mostly of tricalcium silicate, whereas PC-IV had a higher content of dicalcium silicate. Since Portland cements are not made for high temperature applications, a sample of hydraulically setting refractory cement was also tested. This material was CA-14 calcium aluminate cement produced by Alcoa Industrial Materials. The material is serviceable at temperatures up to 1980° C. (3100° F.).

The pelletized sorbent was prepared with a small bench-scale drum pelletizer which had a diameter of 25 cm (10 in.) and could be operated at various speeds. The general procedure for making core-in-shell pellets is shown in FIG. 1. For preparing pellets with a limestone core and a cement shell the procedure involved placing a measured amount (approximately 100 g) of pulverized limestone in the drum. The drum was operated at a fixed speed which was between 60 and 80 rpm. Deionized water was added continuously at frequent intervals as a fine spray until small spherical pellets formed. The small limestone pellets were grown into larger pellets by introducing more limestone while spraying the pellets with water. When the pellets reached a desired size, they were allowed to tumble for a prolonged period which improved the sphericity and uniformity of the pellets. The pellets were then separated into various sizes by hand screening with 5, 6 and 7 mesh screens. Next, a batch of uniformly sized pellets were returned to the pelletizing drum for coating with cement. While the drum speed was maintained constant, a measured quantity (approximately 50 g) of cement powder was added gradually as the pellets were sprayed with water. In some cases, before the cement was applied it was premixed with some dry potato starch (2 wt. %) to enhance the porosity of the cement after the pellets were heated to the temperature where they would be used. Alternatively, a mixture of cement and powdered limestone was used for coating the limestone pellets, and no starch was employed. In either case, the coated pellets were tumbled for a prolonged period to consolidate the coating. Afterwards, the pellets coated with cement and starch were air-dried at room temperature for 20 hr. to improve their green strength, and then the pellets were cured for 3 days in a steam atmosphere at 100° C. In the case of pellets coated with a mixture of cement and limestone, the air-drying step was omitted because of their greater green strength, but the pellets were still steam cured.

The cured pellets were tested to determine their crushing strength and capacity for adsorbing $H_2S$. The crushing strength of a single pellet was determined by measuring the force required to break the pellet when it was placed between the two plates of an Accuforce EZ250 test stand, and the upper plate was lowered at a rate of 10 mm/min. The determination was repeated with several different pellets selected at random from each batch of pellets.

In most cases the adsorption capacity of the pelletized material was determined by using a thermogravimetric analysis (TGA) system to measure the gain in weight over time of a single calcined pellet exposed to a dilute $H_2S$ stream at a predetermined temperature. The pellet was suspended in a quartz basket from a Cahn model 2000 electrobalance which could weigh with an accuracy of 0.1 mg. The basket was contained within a vertical tubular reactor made of quartz which was surrounded by an electric furnace capable of maintaining a constant temperature. The reactor was supplied with a gas mixture having a known composition at a known flow rate. To obtain the adsorption test results reported below, the adsorbent was held at 1153° K. (1615° F.) while a gas mixture comprised of 1.1% $H_2S$ and 98.9% $N_2$ flowed over the material.

Example 1

In order to establish a baseline for comparison, several batches of pellets with sorbent properties were prepared initially by using only a single component, either Portland cement or limestone. Homogeneous pellets were produced without an outer shell made of a different material. Each batch was made with either a different type of Portland cement or pulverized limestone which passed a 297 μm screen. Each batch of pellets was tested to determine the compressive strength after curing and after calcination and also the adsorption capacity of the material.

The ratio of the breaking force to pellet diameter is indicated in Table 1 for both the steam-cured and the calcined cement pellets. The ratio for the calcined pellets ranged from 12 to 24 N/mm (69 to 137 lb/in.) and was high which suggests that the pellets would be durable. The limestone pellets, on the other hand, were very fragile.

Figure 2:
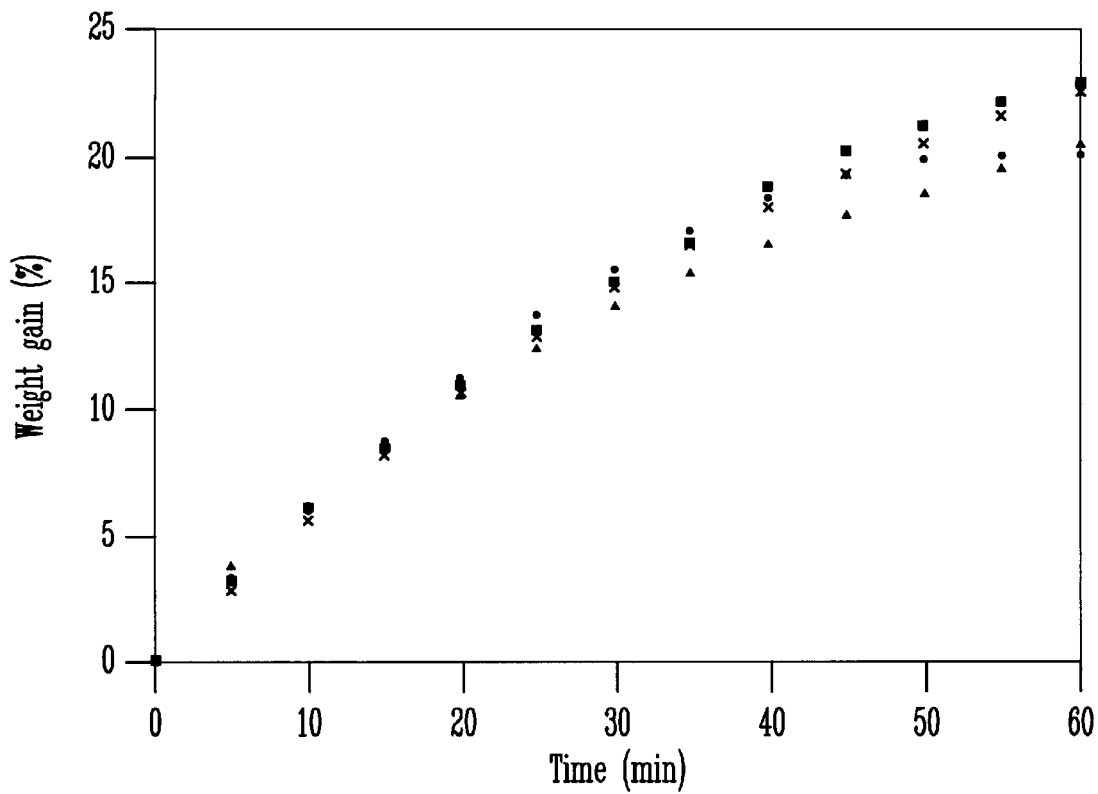
FIG. 2 shows the result of four replicates of an adsorption test conducted with 3.96 mm diameter limestone pellets treated with 1.1% $H_2S$ at 880° C.

The adsorption capacity of the pellets was determined by first heating a single pellet in a stream of nitrogen in the TGA systems to 1153° K. (1615° F.), and then as the temperature was held constant, the gain in weight of the sorbent was measured over a 1.0 hr. period as it was treated with a gas stream consisting of 1.1% $H_2S$ and 98.9% $N_2$. It should be noted that as the cement pellets were being heated to 1153° K. (1615° F.), they experienced a weight loss of about 15% between 373 and 553° K. (212 and 535° F.) due to the decomposition of hydrated calcium silicates. Also, as the limestone pellets were heated, they suffered a weight loss of about 44% at approximately 970° K. (1290° F.) due to the decomposition of the carbonate minerals. Therefore, the material appeared to be fully calcined when treated with the dilute $H_2S$ stream. To check the reproducibility of the TGA data, spherical limestone pellets, 3.96 mm in diameter, made from −297 μm particles were tested. After calcination for 2 hrs. under nitrogen, the pellets were allowed to react with 1.1% $H_2S$ at 880° C. for one hour. The results of four replicate runs are shown in FIG. 2. The average capacity was 21.60% with a standard deviation of 1.44%. The percent weight gain of the different materials due to reaction with $H_2S$ is shown in Table 1.

TABLE 1

Average breaking force and adsorption capacity of various pelletized materials.

| Sorbent Material | Pellet dia., mm | Cured breaking force, N/mm | Calcined breaking force, N/mm | Wt. Gain, % | Conversion, % |
|---|---|---|---|---|---|
| PC-I | 3.35 | 22 | 12 | 5.84 | |
| PC-III | 3.35 | 52 | 22 | 3.37 | |
| PC-IV | 3.35 | 53 | 24 | 3.38 | |
| Limestone | 3.96 | — | — | 22.0 | 83 |
| Limestone | 3.96 | — | — | 23.0 | 86 |

It can be seen that the weight gain of the different cements was only 3 to 6%, whereas the gain in weight of the limestone was 22-23%. Therefore, it is apparent that the adsorption capacity of limestone for $H_2S$ is much greater than that of Portland cement. Furthermore, the results achieved with limestone were reasonably reproducible.

Yoo and Steinberg (1983) suggested that the following reaction is responsible for the gain in weight as type III Portland cement reacts with $H_2S$:

$$(CaO)_3SiO_2+H_2S=(CaS)_3SiO_2+H_2O \qquad (2)$$

By comparison, the gain in weight as lime reacts with $H_2S$ is due to the following reaction:

$$CaO+H_2S=CaS+H_2O \qquad (3)$$

If it is assumed that type III Portland cement is largely tricalcium silicate, it would experience a gain in weight of 22% as it becomes fully reacted. Lime would experience a gain in weight of 29%. Consequently, the weight gains reported in Table 1 indicate that the conversion of type III Portland cement was much lower than the conversion of lime under similar conditions, and, therefore, Portland cement is a much less effective sorbent than lime.

Example 2

In order to combine the advantages of cement and lime into a single material, several batches of pellets were prepared where each pellet consisted of a limestone core and a cement shell. Each batch was made with a different type of Portland cement or CA-14 calcium aluminate refractory cement. The limestone core was made by pelletizing pulverized limestone which passed a 297 μm screen. In most cases, the limestone core had a diameter of 3.96 mm, while the finished pellet had a diameter of 4.76 mm. Hence, the shell thickness was 0.40 mm. The exception was a second batch of pellets made with type IV Portland cement where the core diameter was 2.35 mm and the shell thickness was 0.50 mm. The important properties of the different batches of pellets are indicated in Table 2.

TABLE 2

Average breaking force and adsorption capacity of cement-coated limestone pellets. Weight gain was after exposure to 1.1% $H_2S$ at 880° C. for one hour.

| Coating material | Coating thick., mm | Pellet dia., mm | Cured breaking force, N/mm | Calcined breaking force, N/mm | Wt. Gain, % | Comments |
|---|---|---|---|---|---|---|
| PC-I | 0.40 | 4.76 | 1.82 | ~0.84 | 13.8 | Shell cracks |
| PC-III | 0.40 | 4.76 | 12.8 | ~0.84 | 10.3 | |
| PC-IV | 0.40 | 4.76 | 9.3 | 3.36 | 9.2 | Shell cracks |
| PC-IV | 0.50 | 3.35 | 13.8 | Na | 10.1 | |
| CA-14 | 0.40 | 4.76 | 10.9 | 1.26 | 8.9 | |

The force required to break either the steam-cured or calcined pellets was much lower than observed for the solid cement pellets (see Table 1). The breaking force of the calcined pellets is considered inadequate for most applications. However, the strength of the pellets coated with CA-14 calcium aluminate refractory cement was similar to that of pellets coated with Portland cement. After the pellets were heated and reacted with $H_2S$, small shell cracks were observed on the surface of pellets coated with type I or type IV Portland cement. Such cracks were not observed on the surface of pellets coated with type III Portland cement or CA-14 calcium aluminate refractory cement. Also, the cracks were not observed on pellets which had received a thicker coating of type IV Portland cement.

As before, the adsorption capacity of the different batches of pellets was determined by measuring the 1.0 hr. gain in weight of the calcined pellets exposed to a stream of gas containing 1.1% $H_2S$ in nitrogen at 1153° K. (1615° F.) The results presented in Table 2 show that the gain in weight ranged from 9 to 14% for the cement-coated pellets. This was considerably better than the 3 to 6% noted for the pellets made entirely of cement, but not as good as the 22-23% noted for limestone pellets.

Figure 3:
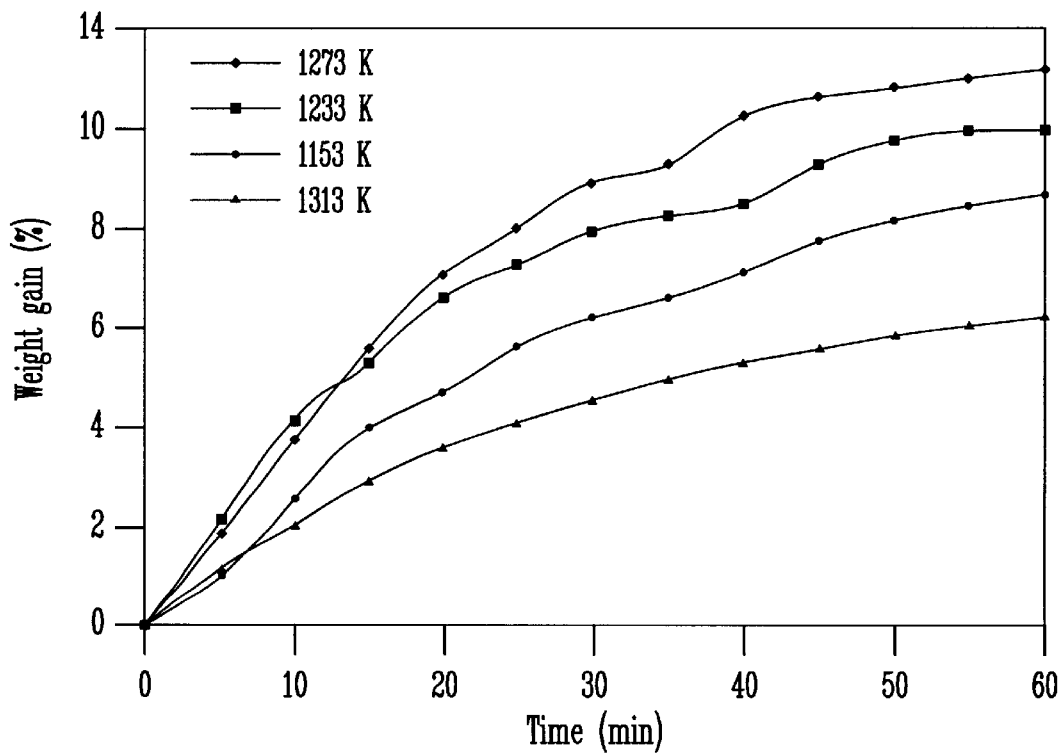
FIG. 3 shows the results of a series of adsorption tests conducted with limestone pellets coated with type IV Portland cement. Overall pellet diameter was 3.35 mm and shell thickness was 0.50 mm.

A series of adsorption tests was conducted with pellets having shells made with type IV Portland cement to investigate the effect of temperature on the rate of adsorption of $H_2S$ in 1.1% concentration. The results of these tests are indicated in FIG. 3. The percent gain in weight of the sorbent over 60 minutes is an indication of the average rate of adsorption during that time. It can be seen that the average of rate of adsorption increased as the temperature was raised from 1153° K. (880° C.) to 1273° K. (1000°) where the rate was a maximum. However, when the temperature was raised to 1313° K. (1040° C.), the rate fell below what it had been at 1153° K. (880° C.). The decrease in rate could have been due to sintering of either the core or shell material.

Example 3

In an attempt to increase the adsorption capacity of the cement-coated pellets, several batches of pellets were produced in which powdered limestone was mixed with type III Portland cement and used as the pellet coating material. Pellets were prepared with two different shell thicknesses and various concentrations of limestone in the shell. The properties of the different pellets are shown in Table 3.

TABLE 3

Average breaking force and adsorption capacity of limestone pellets coated with a mixture of limestone and type III Portland cement.

| Pellet dia., mm | Cement Coating Thick., mm | Cement Coating Conc., % | Cured breaking force, N/mm | Calcined breaking force, N/mm | Wt. Gain*, % |
|---|---|---|---|---|---|
| 4.76 | 0.40 | 0 | 12.8 | ~1.1 | 10.3 |
| 4.76 | 0.40 | 20 | 7.8 | ~1.0 | 11.2 |
| 4.76 | 0.40 | 40 | 8.9 | ~0.9 | 13.0 |
| 4.76 | 0.40 | 80 | 5.8 | ~0.9 | 20.7 |
| 5.60 | 0.83 | 20 | 9.8 | 4.5 | 8.6 |
| 5.60 | 0.83 | 40 | 11.1 | 1.2 | 11.3 |
| 5.60 | 0.83 | 60 | 12.5 | 1.4 | 13.0 |
| 5.60 | 0.83 | 80 | 5.2 | 1.1 | 18.5 |

*Exposed to 1.1% $H_2S$ at 880° C. for one hour.

It is very apparent that adding limestone to the shell increased the percent gain in weight of the calcined pellets treated with 1.1% $H_2S$ at 1153° K. (1615° F.) for 1.0 hr. Furthermore, the adsorption capacity increased in proportion to the limestone concentration in the shell. On the other hand, the force required to break the uncalcined pellets decreased noticeably when limestone was added to the shell. However, this effect was counterbalanced by making the shell thicker. Again, the force required to break the calcined pellets was lower than that considered adequate.

Example 4

Because of the large adsorption capacity but low compressive strength of pellets made with 80% limestone in the shell, further consideration was given to shell strengthening. It was subsequently found that control of the limestone particle size and an extended pelletization time improved shell strength. To study the effect of pelletization time, several more batches of pellets were produced in which the time allotted for tumbling after the limestone pellets were coated with a mixture of cement and limestone particles was varied. The limestone pellets were prepared from −297/+210 μm size particles and were thoroughly consolidated by allowing them to tumble for 1.0 hr. before applying a coating. During this time, the pellets were kept moist by occasionally spraying them with water. For the coating, −297/+210 μm limestone particles were premixed with cement powder, and then the mixture was applied to the pellets as they were treated with a fine water spray in the pelletizing drum.

The coating procedure required about 5 min. The coated pellets were then allowed to tumble for either 15, 60, or 120 minutes. The product was subsequently steam-cured for 3 days and tested. Type III Portland cement was used for some batches and CA-14 calcium aluminate refractory cement for other batches.

The prepared pellets were characterized as before, and the results are shown in Table 4.

TABLE 4

Average breaking force and adsorption capacity of limestone pellets coated with a mixture of 80% limestone and 20% cement.

| Pellet Coating | | Pellet | Tumbling | Breaking force, N/mm | | Wt. |
|---|---|---|---|---|---|---|
| Cement | Thick., mm | Dia., mm. | Time, min. | Cured | Calcined | Gain*, % |
| PC-III | 0.40 | 4.76 | 15 | 5.8 | <1 | 16.0 |
| PC-III | 0.40 | 4.76 | 60 | 16.1 | <1 | 9.9 |
| PC-III | 0.40 | 4.76 | 120 | 18.7 | <1 | 8.3 |
| CA-14 | 0.40 | 4.76 | 15 | 4.8 | 1.5 | 17.5 |
| CA-14 | 0.40 | 4.76 | 60 | 7.6 | 2.6 | 14.1 |
| CA-14 | 0.40 | 4.76 | 120 | 12.1 | 2.1 | 13.7 |
| CA-14 | 0.83 | 5.62 | 120 | 20.7 | 2.5 | 11.4 |

*Exposed to 1.1% $H_2S$ at 880° C. for one hour.

It is apparent that with either type of cement the force required to break the cured but uncalcined pellets increased with an increase of tumbling time from 15–60 min. A further increase in tumbling time had little effect. Also, the breaking force was considerably greater for cured pellets coated with a mixture of type III Portland cement than with a mixture of CA-14 calcium aluminate cement. However, the pellets were considerably weaker after calcination, more so for pellets coated with type III Portland cement. While the pellets coated with a mixture of type III Portland cement tended to crack and fall apart during reaction with $H_2S$, those coated with a mixture of CA-14 calcium aluminate cement remained intact. Furthermore, pellets coated with a mixture of CA-14 cement exhibited larger weight gains when reacted with $H_2S$. While the weight gains achieved with pellets coated with CA-14 cement were more than adequate, the calcined pellet strength was still inadequate for some applications.

Example 5

Although the limestone core in cement shell structure showed considerable promise for a high temperature sorbent, it was soon discovered that the composition of both the core and shell was critical. Initial experiments indicated the shell tended to develop small cracks if the core was made entirely of limestone or the shell was made entirely of cement. The cracking tendency was overcome by adding some cement to the core and some limestone to the shell. Cracking was avoided when the core contained 20 wt. % calcium aluminate cement and the shell contained 60 wt. % limestone. To investigate the importance of shell composition further, pellets were produced with 40, 60, 80 wt. % limestone in the shell. Half the pellets were made with a shell thickness of 0.40 mm and half with a shell thickness of 0.83 mm. The limestone used for this purpose was obtained from the Three Rivers Quarry in Kentucky, and it contained 92.8 wt. % $CaCO_3$, 5.9 wt. % $MgCO_3$, and 1.1 wt. % $SiO_2$, according to the supplier. The material was ground and screened to provide −297/+210 μm size particles for pelletization. The calcium aluminate cement was type CA-14 from Alcoa, and it was composed of -44/+37 μm size particles.

To prepare the pellet cores with 80 wt. % limestone and 20 wt. % cement, the dry powders were premixed and placed in a pelletizing drum. As the drum revolved, a fine water spray was applied every 6–8 min. Although the material balled up rapidly, the sphericity and uniformity of the pellets improved by continuing to tumble the pellets for at least 1.0 hr. The pellets were subsequently screened carefully, and the −4.76/+3.96 mm size pellets were returned to the pelletizer drum for coating. The coating was applied by adding a mixture of limestone and cement particles to the tumbling pellets and by applying a fine water spray as needed. While the pellets were completely coated within a few minutes, they were kept in the revolving drum for 2.0 hrs. to improve their physical properties. During this time, a fine water spray was applied at 6–8 min. intervals to keep the pellets moist. Afterwards, the pellets were screened again, and the −5.83/+4.76 mm and −6.68/+5.63 mm sizes were selected for testing. These pellets were generally air-dried for one day and then steam cured at 100° C. for three days. One portion of the cured pellets was set aside for various physical tests while another portion was calcined at 1000° C. for 2.0 hrs. before testing.

The prepared pellets were subjected to various physical tests to determine their compressive strength, pore volume, surface area, and apparent porosity. The force required to break a pellet under compression was measured and divided either by the pellet diameter or by the pellet cross-sectional area. This test was repeated 5 times for each batch of pellets. The apparent porosity of the pellets was measured by gas pycnometry. The surface area was determined by using the BET method and measuring the adsorption of nitrogen at 77.35° K.

The apparent adsorption capacity of the calcined pellets was determined by measuring the gain in weight of a single pellet held at a preselected temperature and exposed to a gas stream consisting largely of nitrogen with a small amount of $H_2S$. As the pellet reacted with $H_2S$, it gained weight which was measured with a sensitive electrobalance.

The results of formulating a series of core-in-shell pellets with different proportions of limestone and calcium aluminate cement in the shell are shown in Table 5.

Table 5. Characteristics of various core-in-shell formulations. The core is comprised of 80% limestone and 20% calcium aluminate cement. The shell contains varying amounts of limestone as indicated in the third column.

TABLE 5

Characteristics if various core-in-shell formulations. The core is comprised of 80% limestone and 20% calcium aluminate cement. The shell contains varying amounts of limestone as indicated in the third column.

| Sorbent | Diam., mm | Shell thick., mm | Limestone conc., wt. % | Breaking force, N/mm | | Wt. Gain,[a] % |
|---|---|---|---|---|---|---|
| | | | | Cured | Calcined | |
| A | 5.60 | 0.83 | 40 | 55.0 | 20.1 | 3.2 |
| B | 5.60 | 0.83 | 60 | 33.4 | 13.2 | 5.6 |
| C | 5.60 | 0.83 | 80 | 8.1 | 2.5 | 10.5 |
| D | 4.76 | 0.40 | 40 | 47.5 | 18.8 | 4.8 |
| E | 4.76 | 0.40 | 60 | 26.7 | 12.9 | 8.4 |
| F | 4.76 | 0.40 | 80 | 7.5 | 1.8 | 11.0 |

[a]Treated with 1.1% $H_2S$ at 880° C. for 1.0 hr.

In each case, the core was composed of 80 wt. % limestone with 20 wt. % cement. The breaking force is indicated for both the cured pellets and the calcined pellets, but not for the pellets which had been reacted with $H_2S$. The apparent adsorption capacity of the calcined pellets is also shown. The adsorption capacity represents the gain in weight of the pellets exposed to a gas stream containing 1.1% $H_2S$ at 880° C. for 1.0 hr. Each listed value of adsorption capacity is an average of three determinations. It can be seen that the force required to break the calcined pellets was much less than that require to break the cured but otherwise untreated pellets.

Also, the breaking force decreased markedly as the limestone concentration of the shell rose. On the other hand, the adsorption capacity increased noticeably as the limestone concentration increased. Shell thickness appeared to have a greater effect on adsorption capacity than on pellet strength. The percent gain in weight was noticeably larger for the pellets with the thinner shells which could have been due to their overall higher lime content, whereas the force required to break the pellets with the thinner shells was only slightly lower. The crushing strength of all the sorbents in Table 5 except C and F was more than adequate for most applications. Pellets with the thinner shell made with 60 wt. % limestone appeared to offer the best compromise between crushing strength and adsorption capacity. Therefore, this pellet formulation was selected for more complete characterization.

Example 6

Figure 4:
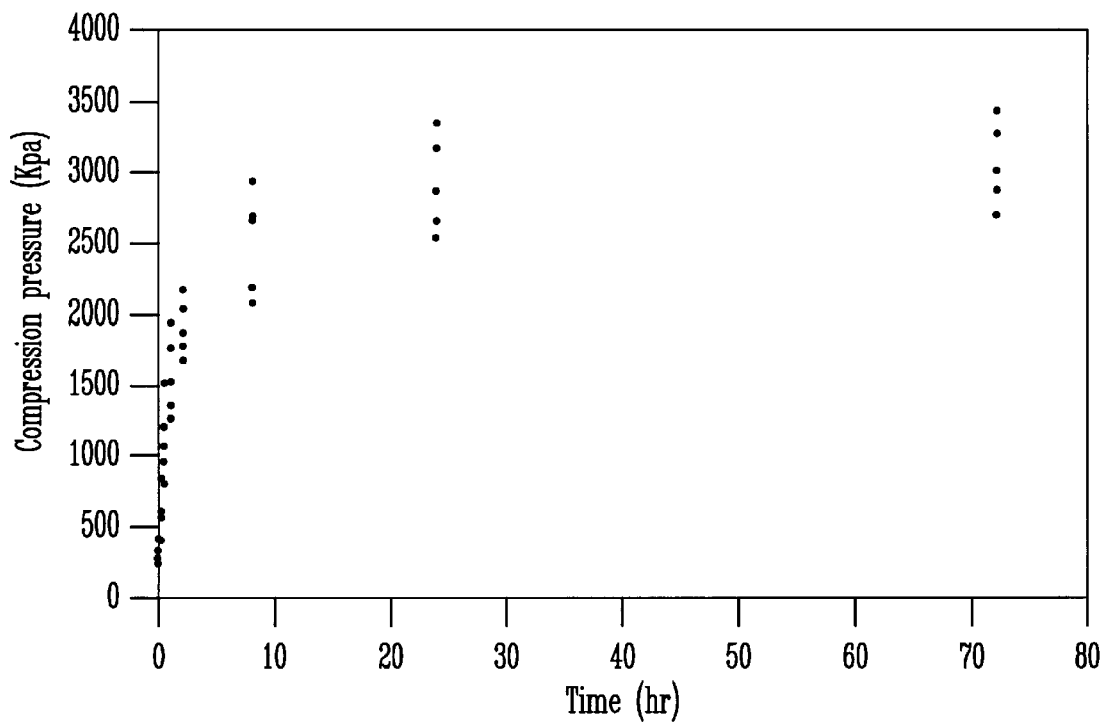
FIG. 4 shows the effect of steam curing time on the pressure required to crush composite pellets with a diameter of 4.76 mm. Core composed of 80% limestone and 20% CA-14 calcium aluminate cement. Shell composed of 60% limestone and 40% CA-14 calcium aluminate cement.

The effect of steam curing time on the compressive strength of the pellets with the apparent optimum composition (80% limestone plus 20% CA-14 in the core and 60% limestone plus 40% CA-14 in the shell) was determined by subjecting different pellets to different curing times which ranged from 0 to 72 hrs. The pellets were tested after curing and also after they had been cured and calcined at 1000° C. for two hours. Pellets which had been steam cured, but not calcined, developed a maximum compressive strength after only 8 hrs. of curing, whereas pellets which had been subjected to both curing and calcining continued to gain strength with up to 72 hrs. of steam curing. However, the additional gain in strength achieved by extending the curing time from 24 to 72 hrs. was slight. The results for the cured and calcined pellets are shown in FIG. 4.

Example 7

Several batches of pellets were prepared with 80 wt. % limestone in the core (20% calcium aluminate cement) and 60 wt. % limestone in the shell (40% calcium aluminate cement). After the pellets had been steam cured for 3 days and calcined at 1000° C. for 2.0 hrs., they were tested by various methods and the results are indicated in Table 6.

TABLE 6

Properties of core-in-shell pellets with 80 wt. % limestone in the core and 60 wt. % limestone in the shell. Results of replicated tests.

| Property | Cured | Calcined |
|---|---|---|
| Breaking force, N/mm | 33.2 | 11.5 |
| Crushing pressure, kPa | 8470 | 3070 |
| Crushing pressure, lb/in$^2$ | 1230 | 445 |
| Pore volume, cm$^3$/g | 0.59 | 0.61 |
| Apparent porosity, % | 48.0 | 65.5 |
| Surface area, m$^2$/g | 8.2 | 6.7 |
| Theoretical maximum weight gain, % | — | 13.5 |
| [a]Actual weight gain, % | — | 7.8 |

[a]Treated with 1.1% H$_2$S at 880° C. for 1.0 hr.

For comparison, the properties of the core alone are shown in Table 7.

TABLE 7

Characteristics make properties of the 3.96 mm diameter core alone (80% limestone and 20% calcium aluminate cement).

| Property | Cured | Calcined |
|---|---|---|
| Breaking force, N/mm | 25.1 | 2.47 |
| Crushing pressure, kPa | 2016 | 198 |
| Pore volume, cm$^3$/g | 0.63 | 0.85 |
| Apparent porosity, % | 69 | 73 |
| Surface area, m$^2$/g | 3.5 | 2.0 |
| Theoretical maximum weight gain, % | — | 17.15 |

The core-in-shell pellets had a shell thickness of 0.4 mm and an outside shell diameter of 4.76 mm, based on screen size and confirmed by direct measurement with a pair of calipers. The compressive strength is reported both as the breaking force per unit diameter and the crushing pressure based on the pellet cross-sectional area. The average breaking force for 5 different batches of pellets was 33.2 N/mm after curing and 11.5 N/mm after both curing and calcining. While the crushing strength of the pellets was reduced by the heat treatment, the other properties were affected much less. Calcining caused the apparent porosity to rise which is probably due to the evolution of carbon dioxide and the creation of larger pores as a result of incipient sintering. Calcining also reduced the surface area which seemed to reflect the conversion of smaller pores into larger pores by sintering.

In comparison to the core only, it can be seen that the 0.4 mm shell thickness which made up 42% of the total pellet volume provided more than 78% of the entire pellet strength which confirms the concept that the shell amounts for most of the pellet strength.

By employing thermogravimetric analysis it was possible to measure the quantity of limestone in a pellet core or in an entire pellet. When such measurements were replicated three times, the average limestone content was found to be 76.6% for the core and 64.8% for the entire pellet, respectively. By using these values, it was possible to calculate the theoretical maximum weight gain when the materials reacted with hydrogen sulfide to produce calcium sulfide according to the following reaction:

$$CaO+H_2S=CaS+H_2O \qquad (1)$$

The calculated values are recorded in Tables 6 and 7, respectively.

Figure 5:
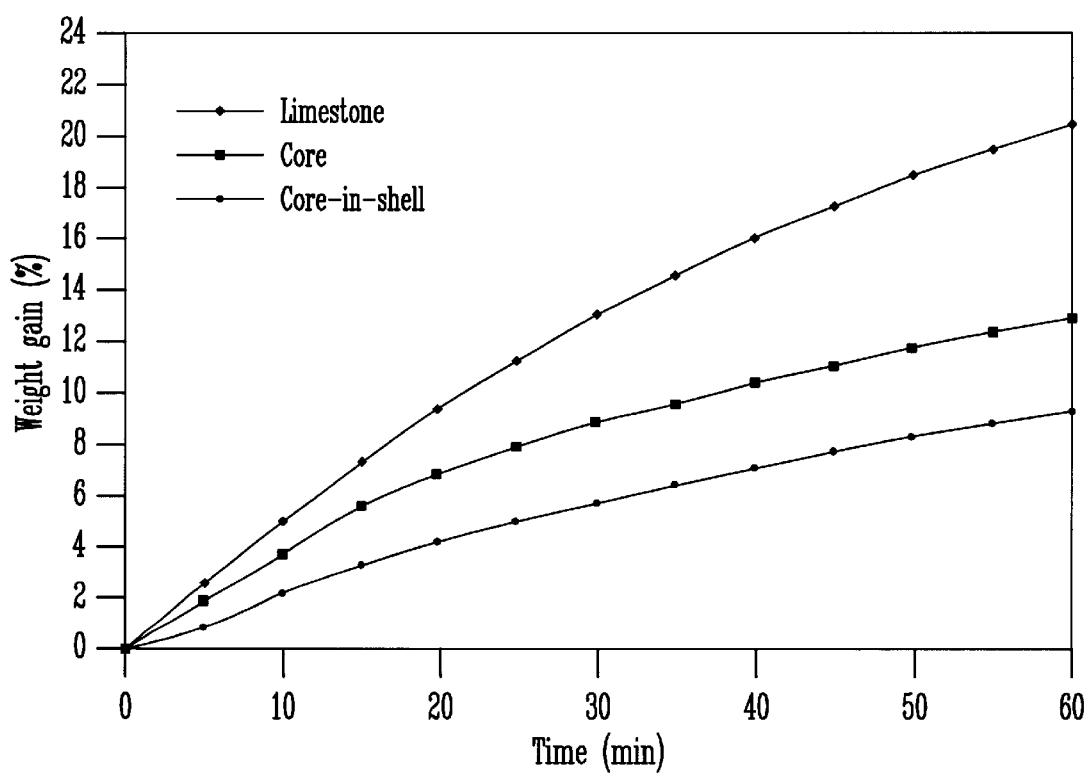
FIG. 5 shows how the rate of adsorption differs among a limestone pellet, a core composed of 80% limestone and 20% CA-14 calcium aluminate cement, and a pellet with a similar core surrounded by a shell composed of 60% limestone and 40% CA-14 calcium aluminate cement.

Several adsorption tests were conducted to compare the rate of adsorption of a pellet core comprising 80% limestone and 20% calcium aluminate cement with the rate of adsorption of entire pellet having the same core composition and a shell composed of 60% limestone and 40% calcium aluminate cement. The rate of adsorption of these materials was further compared with the rate of adsorption of a pure limestone pellet. The results are presented in FIG. 5. The percent gain in weight of a pellet over 60 minutes is an indication of the average rate of adsorption or conversion during that time. It can be seen that in 60 minutes the limestone pellet gained 21% (81% conversion), the core alone gained 12.9% (65% conversion), the entire pellet gained 9.3% (69% conversion). Therefore, the shell did not seem to limit the rate of conversion.

Example 8

A series of adsorption tests was conducted to study the effects of temperature and gas concentration on the apparent rate of conversion of the prepared core-in-shell pellets. Again, the pellets selected for these tests were prepared with 80 wt. % limestone in the core and 60 wt. % limestone in the shell, the remainder being calcium aluminate cement in each case. The pellets were steam cured for 3 days and calcined at 1000° C. for 2 hrs. before testing.

Figure 6:
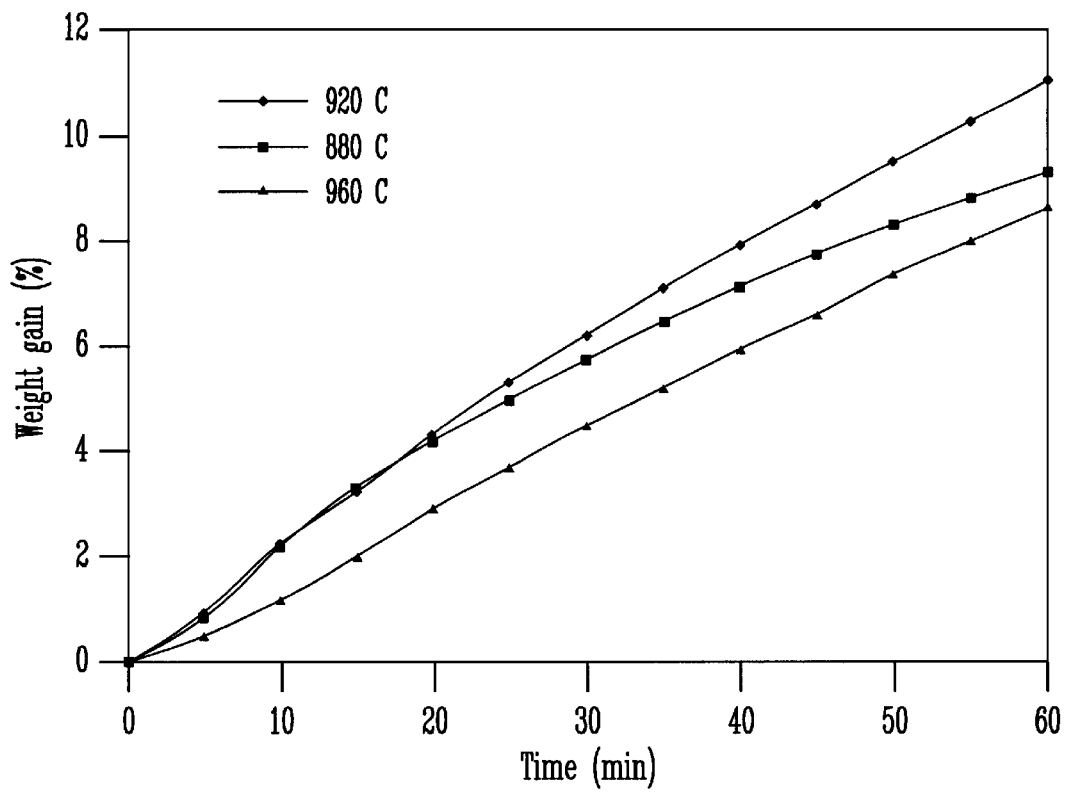
FIG. 6 shows the effect of temperature on rate of adsorption of composite pellets treated with 1.1% $H_2S$ at 880° C. Pellet composition is the same as in FIG. 4.
Figure 7:
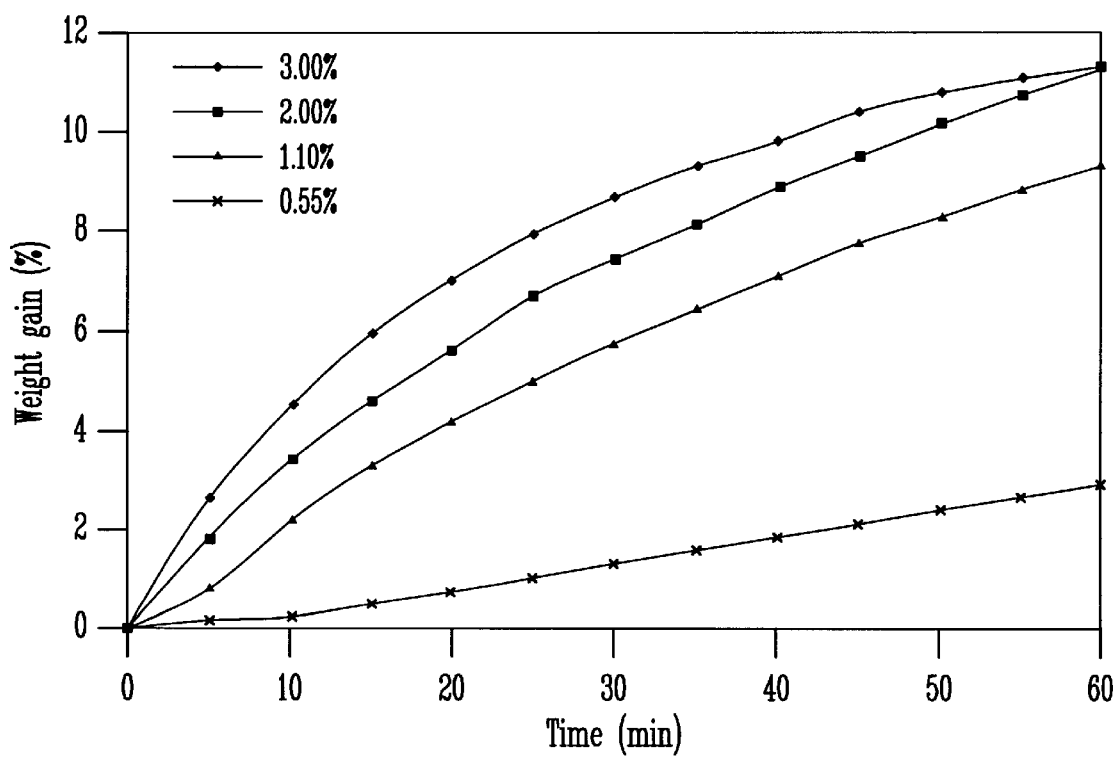
FIG. 7 shows the effect of $H_2S$ concentration on the rate of adsorption of composite pellets at 880° C. Pellet composition is the same as in FIG. 4.

FIG. 6 shows the apparent rate of adsorption of core-in-shell pellets exposed to 1.1% $H_2S$ at different temperatures. There was an increase in adsorption rate when the temperature was raised from 880 to 920° C. However, there was a drop in adsorption rate when the temperature was further raised to 960° C. FIG. 7 shows the effect of $H_2S$ concentration on the apparent adsorption rate. There was a large increase in adsorption rate when the $H_2S$ concentration was increased from 0.55% to 1.10% and smaller increases in the adsorption rate when the $H_2S$ concentration was increased further.

Limestone and Alumina

The core-in-shell approach was used to fabricate limestone and alumina pellets as well. Alumina was chosen as an inert, strong, shell material. Several alumina shell formulations were made and tested for strength. A shell formulation which produced superior results consisted of 48 wt. % tabular alumina, 32 wt. % A-16SG alumina, and 20 wt. % pulverized limestone. The tabular alumina particles had a median diameter of 8.65 μm, whereas the A-16SG alumina powder had a median particle diameter of 0.88 μm. Both materials were obtained from the Alcoa Co. Two different sources of limestone were utilized. Most of the testing was conducted with limestone from the Ames, Iowa quarry of the Martin Marietta Co. Some tests were conducted with limestone from the Three Rivers Quarry located near Smithland, Ky.

Pellet cores were prepared by mixing −297/+44 μm pulverized limestone with varying amounts of A-16SG alumina. The mixtures were pelletized using the previously described technique except that a dilute solution of lignin was used instead of pure water to promote particle adhesion. Once the pellets of the desired size were formed, they were allowed to tumble for one hour. Thereafter, pellets of a particular mesh size were reloaded into the pelletizer and coated with a powder mixture for the alumina-based shell. Once coated, the pellets were allowed to tumble for a two-hour period. The lignin solution was sprayed at 5-minute intervals during the pelletization. The pellets were subsequently removed and screened. Those with the desired mesh diameters were retained and calcined at 1100° C. for two hours.

Example 9

Several batches of core-in-shell pellets were made with varying concentrations of Iowa limestone in the core, but using the same shell composition. The pellet diameter and shell thickness were also varied among batches. The nominal core and pellet diameters were estimated by observing the mesh size of the standard testing screens which would just pass the spherical pellets. The finished pellets were evaluated by measuring their crushing strength and adsorption capacity. The results are presented in Table 8.

TABLE 8

Adsorption capacity and crushing strength of sorbents with an alumina shell

| Sorbent | Core limestone conc., wt. % | Nominal diameter, mm Core | Nominal diameter, mm Pellet | Shell thick., mm | Ave. breaking force, N/mm | Adsorption[a] cap., wt. % |
|---|---|---|---|---|---|---|
| A | 80 | 3.35 | 3.96 | 0.30 | 7.6 | 6.99 |
| B | 90 | 3.35 | 3.96 | 0.30 | 8.9 | 7.20 |
| C | 100 | 3.35 | 3.96 | 0.30 | 3.4 | 12.26 |
| D | 80 | 3.96 | 4.76 | 0.40 | 9.6 | 4.80 |
| E | 90 | 3.96 | 4.76 | 0.40 | 4.0 | 8.14 |
| F | 100 | 3.96 | 4.76 | 0.40 | 3.2 | 12.80 |

[a]Gain in weight of sorbent exposed to 1.1% $H_2S$ at 880° C. for 1 hr.

In each case, the reported breaking force is an average for several batches of pellets and for several pellets within each batch. The reported adsorption capacity is based on several pellets within a single batch for each case. The results indicate that the adsorption capacity and crushing strength are both adequate for sorbents A, B, and D. Although the adsorption capacity of sorbents C and F are high, these sorbents had a low crushing strength which was due to the lack of alumina in the core.

Example 10

Several sorbent formulations were selected for more detailed characterization (see Table 9). Formulation G was the same formulation as that used for sorbent B in Table 8.

TABLE 9

Specific characteristics of various sorbent formulations with an alumina shell

| Formulation | G | H | I | J |
|---|---|---|---|---|
| Source of limestone | Iowa | Kentucky | Iowa | Iowa |
| Pellet diameter, mm | 4.20 | 4.23 | 5.88 | 4.80 |
| Shell thickness, mm | 0.40 | 0.42 | 0.55 | 0.78 |
| Fractional shell volume, % | 47 | 48 | 46 | 69 |
| Breaking force, N/mm | 8.94 | 8.57 | 10.82 | 16.44 |
| Breaking pressure, kPa | 2877 | 2758 | 3485 | 5293 |
| Apparent density, g/cm³ | 3.40 | 3.30 | 3.35 | 3.46 |
| Pore volume, cm³/g | 0.294 | 0.303 | 0.300 | 0.289 |
| Apparent porosity, % | 52.7 | 38.4 | 40.2 | 43.8 |
| Adsorption capacity, %* | 7.20 | 11.34 | 3.47 | 4.83 |

*Exposed to 1.1% $H_2S$ at 880° C. for 1 hr.

Three of the formulations were made with Iowa limestone and one with Kentucky limestone. In each case, the core consisted of 90 wt. % limestone and 10 wt. % A-16SG alumina, while the shell had the same relative proportions of alumina and limestone as before. Table 8 indicates that the overall pellet diameter and shell thickness were essentially the same for the first two formulations, but differed for the third and fourth formulation. The pellet dimensions were determined accurately by measuring the overall pellet diameter and shell thickness of a number of pellets with a hand held caliper and averaging the results. The fractional shell volume was calculated by using the following equation:

$$V(\%) = \left(1 - \frac{d^3}{D^3}\right)100 \quad (7)$$

where d is the core diameter and D is the overall pellet diameter. The ratio of pellet breaking force to pellet diameter is reported as well as the pellet breaking pressure, which is the ratio of the breaking force to the pellet cross-sectional area. The breaking force was adequate in all cases for most applications, and it increased with shell thickness. The breaking force did not vary significantly between the Iowa and Kentucky limestones. However, the Kentucky limestone had a greater adsorption capacity as indicated by its gain in weight when exposed to $H_2S$. While the last two sorbents were stronger than the first two, their adsorption capacity was lower. These effects were due in all likelihood to the greater shell thickness of the last two formulations.

Figure 8:
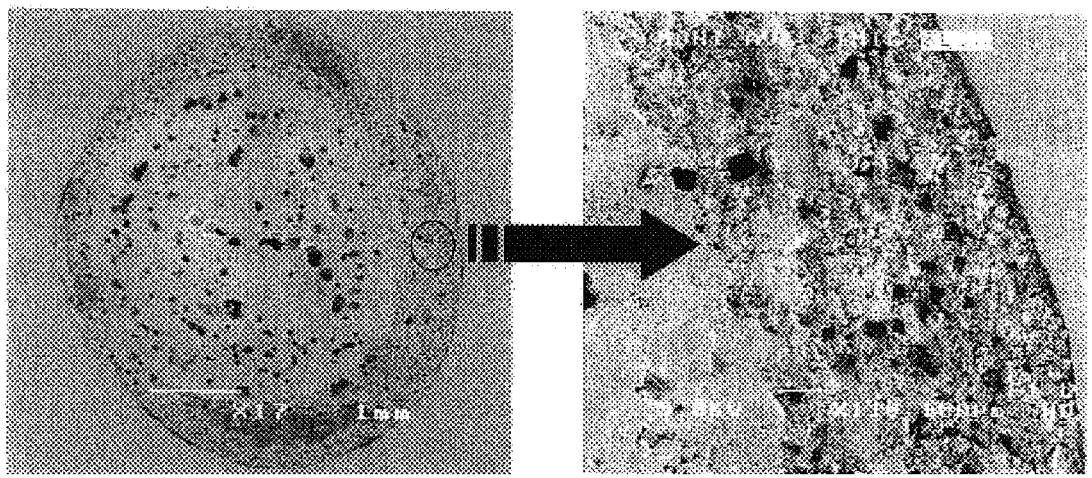
FIG. 8 is a micrograph of a cross section of a freshly made core-in-shell pellet. Core composed of 90% limestone and 10% A-16SG alumina. Shell composed of 48% tabular alumina, 32% A-16SC alumina, and 20% limestone.
Figure 9:
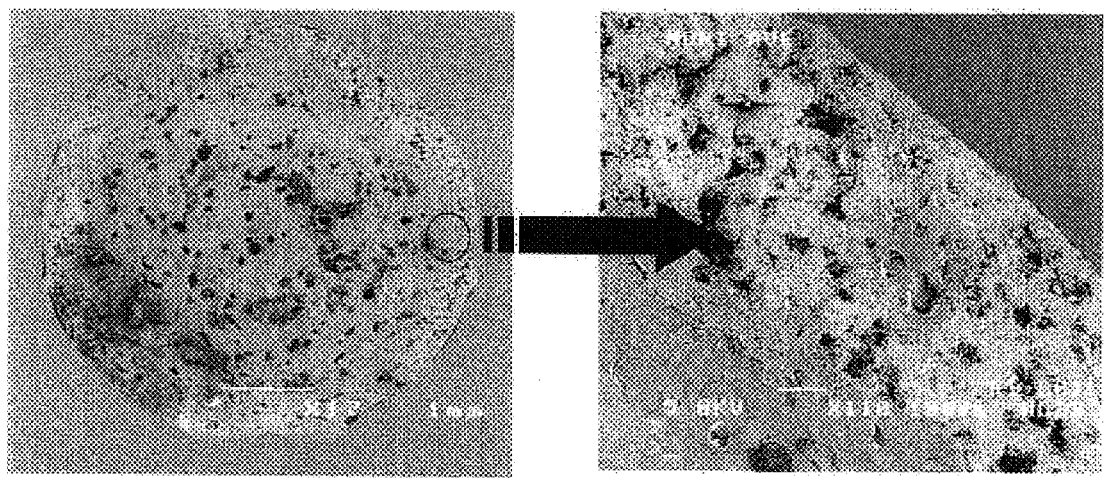
FIG. 9 is a micrograph of a cross section of a core-in-shell pellet after heat treatment at 1100° C. for 2 hrs. Pellet composition is the same as in FIG. 8.

The core-in-shell pellet structure can be seen in micrographs obtained with a scanning electron microscope. Pellets containing 90 wt. % limestone and 10 wt. % A-16SG alumina in the core and having an overall diameter of approximately 4.5 mm and shell thickness of approximately 0.6 mm were selected for examination. FIG. 8 is a micrograph of a freshly made pellet before it has been heat treated. The entire pellet cross section is shown on the left and an enlarged view of the shell cross section is shown on the right. The boundary between the core and shell can be seen in both views. There is a pronounced difference in the texture of the core and shell. The shell has a much coarser texture than the core because only the shell contains the larger tabular alumina particles. A number of holes or voids are present in both the core and shell. FIG. 9 is a micrograph of a sorbent pellet after it has been heat treated at 1100° C. for 2 hours. Again, the entire pellet cross section is shown on the left, and an enlarged view of the shell cross section is shown on the right. The boundary between the core and shell is clearly visible. A number of holes or voids can be seen in both the core and shell. The texture of the shell is much finer than it was before heat treatment. The finer texture is the result of particle sintering which serves to bind the particles into a strong and durable structure.

Other Materials

The core-in-shell concept is not limited to calcium-based sorbents. The concept can be applied to other sorbent materials which lack the necessary strength and durability in themselves to withstand repeated loading and regeneration. The effects of loading and regeneration can be particularly severe where the sorbent is converted from one chemical species to another during loading and then is converted back to the original species during regeneration. Such changes are accompanied by changes in the physical structure of the material which can produce changes in the specific volume of the material. Repeated swelling and shrinking of the material as it is loaded and regenerated can weaken the material and lead to spalling and disintegration. This type of failure has been observed with zinc-based sorbents where the material undergoes significant changes in specific volume during regeneration.

The core-in-shell concept is particularly advantageous for supporting any reactive sorbent which may lack the necessary strength to withstand extensive physical handling or repeated changes in specific volume as it is loaded and regenerated. The shell itself can be made of various refractory materials which do not react with the gases being treated. In the preceding examples, calcium aluminate cement and aluminum oxide are specified as suitable shell materials. Other potential shell materials include various aluminates and silicates or various types of clay which are widely used for making ceramic and refractory products. After these materials are applied in the form of a shell surrounding each core, the pellets are heat treated to cause the refractory particles to sinter and, thereby, adhere to each other forming a strong supporting shell structure. The porosity of the structure can be controlled by introducing small particles which burn out or vaporize during heat treatment. The sintering temperature can be controlled through control of particle size and by introducing small amounts of materials such as feldspar or soda ash which are known to affect the sintering temperature.

Example 11

A superior zinc-based sorbent can be prepared in a core-in-shell configuration by employing the previously described methods. The pellet cores would be prepared first by pelletizing ultrafine-size particles of zinc carbonate. Cores which fall within a selected size range would then be coated with a powder mixture comprising alumina or other sinterable material, such as bentonite clay, together with small quantities of a sintering promoter and a porosity enhancer, respectively, using a disc or drum pelletizer. After air drying, the pellets would be heated gradually to a temperature in the range of 800 to 1100° C. to cause sintering of the shell material. As the pellets are being heated, the zinc carbonate would decompose to form zinc oxide and carbon dioxide gas which is expelled. The heating operation is conducted in air to avoid decomposing zinc oxide. By carefully controlling the heating operation, it is possible to control the degree of particle sintering and provide a balance between strength and porosity. While a completely sintered shell is strong, it is also nonporous, whereas a lightly sintered structure is very porous but also very weak. The porosity can be enhanced by incorporating starch particles in the shell which burn out upon heating in air. The final product would consist of a reactive zinc oxide core encased in a strong protective but porous shell. The sorbent is well suited for removing sulfurous gases from a gas stream produced by coal gasification as long as the temperature does not exceed 700° C. Above this temperature some zinc may be vaporized.

Example 12

A manganese-based sorbent can be prepared in a core-in-shell configuration by employing the previously described methods. While various forms of manganese oxide or carbonate can be used, it may be economically advantageous to utilize a manganese ore containing a large concentration of pyrolusite ($MnO_2$). The finely ground ore would be pelletized by the previously described methods to produce pellet cores. Cores which fall within a selected size range would then be coated in a pelletizing drum with a powder mixture comprising alumina or other sinterable material, such as bentonite clay, together with small quantities of a sintering promoter and a porosity enhancer, respectively. After air drying, the pellets are heated gradually to a temperature in the range of 1000 to 1200° C. to cause sintering of the shell material. By careful control of sintering conditions pellets would be produced with a strong, porous shell. The final product would consist of a manganese oxide core encased in a strong protective but porous shell. The final product can be used for desulfurizing coal gas at temperatures ranging from 700 to 1000° C.

Having described the invention with reference to particular compositions, theories of effectiveness, and the like, it will be apparent to those of skill in the art that it is not intended that the invention be limited by such illustrative embodiments or mechanisms, and that modifications can be made without departing from the scope or spirit of the invention, as defined by the appended claims. It is intended that all such obvious modifications and variations be included within the scope of the present invention as defined in the appended claims. The claims are meant to cover the claimed components and steps in any sequence which is effective to meet the objectives there intended, unless the context specifically indicates to the contrary.

What is claimed is:

1. A layered core-in-shell sorbent consisting essentially of:
   a reactive core wherein the reactive core comprises at least one material selected from the group consisting of calcium oxides, calcium carbonates, copper oxides, chromium oxides, manganese oxides, magnesium oxides, magnesium carbonates, zinc oxides, zinc titanates, iron oxides, strontium oxides, and barium oxides; and
   a porous protective shell surrounding said reactive core to form a layered structure, wherein the shell comprises at least one separate layer of material selected from the group consisting of bentonite clay, attapulgite clay, zeolite, portland cements, high temperature cement, alumina, fly ash, calcium aluminates, and magnesium oxysulfate cement, said separate layer of material allowing diffusion of a compound or class of compounds to the reactive core while maintaining physical integrity of the sorbent under conditions of use.

2. The sorbent of claim 1 further comprising a pore-forming material.

3. The sorbent of claim 2 wherein the pore-forming material comprises a material selected from the group consisting of starch and polyethylene glycol.

4. The sorbent of claim 1 wherein the reactive core comprises a compound which is calcium-based.

5. The sorbent of claim 4 wherein the calcium-based core during preparation comprises a calcium compound selected from the group consisting of limestone, lime, plaster of paris, anhydrite, dolomite, and gypsum.

6. The sorbent of claim 4 wherein the calcium-based core comprises a calcium compound which forms calcium oxide upon exposure to desired operating conditions.

7. The sorbent of claim 1 wherein the protective layer is semi-reactive.

8. The sorbent of claim 1 wherein the protective layer is inert.

9. The sorbent of claim 1 wherein the protective layer comprises hydraulic cement.

10. The sorbent of claim 9 wherein the hydraulic cement is refractory cement.

11. The sorbent of claim 10 wherein the refractory cement is calcium aluminate cement.

12. The sorbent of claim 9 wherein the protective layer during preparation further comprises limestone particles.

13. The sorbent of claim 1 wherein the protective layer during preparation comprises alumina.

14. The sorbent of claim 13 wherein the protective layer during preparation further comprises limestone particles.

15. A layered core-in-shell sorbent for desulfurization of hot gas streams consisting essentially of:
   a reactive core comprising a calcium compound, wherein the calcium compound during preparation is selected from the group consisting of limestone and lime; and
   a protective porous shell surrounding said reactive core to form a layered structure, said shell comprising a separate layer of material selected from the group consisting of cement and alumina; and
   a separate pore-forming material, said separate pore-forming material being different from the protective porous shell material.

16. A method for preparing a core-in-shell sorbent consisting essentially of:
   pelletizing a reactive core, said reactive core comprising at least one material selected from the group consisting of calcium oxides, calcium carbonates, copper oxides, chromium oxides, manganese oxides, magnesium oxides, magnesium carbonates, zinc oxides, zinc titanates, iron oxides, strontium oxides, and barium oxides; and
   coating the core with a protective porous shell comprising at least one material selected from the group consisting of bentonite clay, attapulgite clay, zeolite, portland cements, high temperature cement, alumina, fly ash, calcium aluminates, and magnesium oxysulfate cement and a separate pore-forming material, said separate pore-forming material being different from the protective porous shell material to form a core-in-shell sorbent, said shell coating said core to form a separate layer of material.

17. The method of claim 16 further comprising air drying the core-in-shell sorbent.

18. The method of claim 16 further comprising curing the core-in-shell sorbent.

19. The method of claim 16 further comprising heat-treating the core-in-shell sorbent.

20. A layered core-in-shell sorbent comprising:
   a reactive core wherein the reactive core comprises at least one material selected from the group consisting of refractory cement and hydraulic cement; and
   a porous protective shell surrounding said reactive core to form a layered structure, wherein the shell comprises a separate layer of material which allows diffusion of a compound or class of compounds to the reactive core while maintaining physical integrity of the sorbent under conditions of use.

21. A layered core-in-shell sorbent comprising:
   a reactive core wherein the reactive core comprises at least one material selected from the group consisting of refractory cement and hydraulic cement;
   a porous protective shell surrounding said reactive core to form a layered structure, wherein the shell comprises a said separate layer of material which allows diffusion of a compound or class of compounds to the reactive core while maintaining physical integrity of the sorbent under conditions of use; and
   a separate pore-forming material, said separate pore-forming material being different from the protective porous shell material.

22. A method for preparing core-in-shell sorbents consisting essentially of:

forming reactive cores by pelletizing at least one material selected from the group consisting of calcium oxides, calcium carbonates, copper oxides, chromium oxides, manganese oxides, magnesium oxides, magnesium carbonates, zinc oxides, zinc titanates, iron oxides, strontium oxides, and barium oxides;

discharging the pelletized reactive cores onto a vibrating screen;

coating the cores of a desired diameter with a protective porous shell comprising at least one material selected from the group consisting of bentonite clay, attapulgite clay, zeolite, portland cements, high temperature cement, alumina, fly ash, calcium aluminates, and magnesium oxysulfate cement and a separate pore-forming material to form core-in-shell sorbents, said shell coating said core to form a separate layer of material;

drying the core-in-shell sorbents in air;

curing the sorbents coated with cement in a steam atmosphere at 100° C. for 1–3 days; and curing the sorbents not coated with cement by heating them to a temperature of between 800–1200° C. for a time period sufficient to cause sintering of the shell.

* * * * *